(12) United States Patent
Nishikawa et al.

(10) Patent No.: US 9,393,993 B2
(45) Date of Patent: Jul. 19, 2016

(54) VEHICLE TURNING EFFICIENCY IMPROVING APPARATUS

(75) Inventors: Akiyoshi Nishikawa, Iwata (JP); Akio Nakajima, Iwata (JP)

(73) Assignee: NTN CORPORATION, Osaka (JP)

( * ) Notice: Subject to any disclaimer, the term of this patent is extended or adjusted under 35 U.S.C. 154(b) by 69 days.

(21) Appl. No.: 14/238,635

(22) PCT Filed: Aug. 7, 2012

(86) PCT No.: PCT/JP2012/070097
§ 371 (c)(1),
(2), (4) Date: Feb. 12, 2014

(87) PCT Pub. No.: WO2013/027573
PCT Pub. Date: Feb. 28, 2013

(65) Prior Publication Data
US 2014/0195123 A1    Jul. 10, 2014

(30) Foreign Application Priority Data

Aug. 19, 2011    (JP) .................................. 2011-179542

(51) Int. Cl.
| | | |
|---|---|---|
| B62D 6/00 | (2006.01) |
| B60T 7/22 | (2006.01) |
| B60T 8/1755 | (2006.01) |
| B60W 10/184 | (2012.01) |
| B60W 10/20 | (2006.01) |
| B60W 30/09 | (2012.01) |
| B62D 9/00 | (2006.01) |

(52) U.S. Cl.
CPC ... *B62D 6/00* (2013.01); *B60T 7/22* (2013.01); *B60T 8/1755* (2013.01); *B60W 10/184* (2013.01); *B60W 10/20* (2013.01); *B60W 30/09* (2013.01); *B62D 9/002* (2013.01); *B60T 2201/16* (2013.01)

(58) Field of Classification Search
None
See application file for complete search history.

(56) References Cited

U.S. PATENT DOCUMENTS 5,195,601 A      3/1993   Voigt et al.
6,183,052 B1 *   2/2001   Harada et al. ................. 303/147

(Continued)

FOREIGN PATENT DOCUMENTS

CN      100408406      8/2008
DE      101 00 743     7/2001

(Continued)

OTHER PUBLICATIONS

PCT International Preliminary Report on Patentability mailed Mar. 6, 2014 in corresponding International Application No. PCT/JP2012/070097.

(Continued)

*Primary Examiner* — Rami Khatib (57) ABSTRACT

A vehicle turning efficiency improving apparatus is applicable to an automotive vehicle of a type equipped with either a braking system or a driving train, which is capable of performing a braking force control or a driving force control separately on vehicle wheels and a steering mechanism configured to steer the left and right vehicle wheels separately. A control unit is provided for performing a turn assist control, in which a time difference is generated in steering operation of the left and right vehicle wheels and at least one of a braking and a driving force difference is generated in the left and right vehicle wheels to thereby generate a yaw moment.

8 Claims, 4 Drawing Sheets

(56) References Cited

U.S. PATENT DOCUMENTS

| | | | |
|---|---|---|---|
| 6,719,087 | B2 | 4/2004 | Demerly |
| 6,808,041 | B2 | 10/2004 | Demerly |
| 2001/0032748 | A1 | 10/2001 | Demerly |
| 2002/0189889 | A1 | 12/2002 | Demerly |
| 2004/0099469 | A1* | 5/2004 | Koibuchi et al. .............. 180/421 |

FOREIGN PATENT DOCUMENTS

| | | |
|---|---|---|
| DE | 101 08 421 | 9/2001 |
| EP | 0 512 591 | 1/1992 |
| EP | 1 125 826 | 8/2001 |
| JP | 2001-80491 | 3/2001 |
| JP | 2004-203087 | 7/2004 |
| JP | 2007-38747 | 2/2007 |
| JP | 2010-47047 | 3/2010 |

OTHER PUBLICATIONS

International Search Report mailed Sep. 11, 2012 in corresponding International Patent Application No. PCT/JP2012/070097.

Japanese Office Action dated Mar. 31, 2015 in corresponding Japanese Patent Application No. 2011-179542.

Chinese Office Action issued Jul. 3, 2015 in corresponding Chinese Patent Application No. 201280039762.1.

Extended European Search Report dated May 6, 2016 from corresponding European Patent Application No. 12825236.8, 6 pages.

* cited by examiner

VEHICLE TURNING EFFICIENCY
IMPROVING APPARATUS

CROSS REFERENCE TO THE RELATED
APPLICATION

This application is a U.S. national stage application of PCT/JP2012/070097 filed Aug. 7, 2012, and claims foreign priority benefit of Japanese Patent Application No. 2011-179542 filed Aug. 19, 2011 in the Japanese Intellectual Property Office, the contents of both of which are incorporated herein by reference.

BACKGROUND OF THE INVENTION

1. Field of the Invention

The present invention relates to a turning efficiency improving apparatus for an automotive vehicle of a type, in which at the time of emergency steering such as represented by, for example, obstacle avoidance, a difference in braking force or a difference in driving force is generated on inside and outside vehicle wheels with respect to turning with the use of braking force sources or driving force sources that can implement left and right separate controls, respectively, so that a yaw moment of the vehicle resulting from the braking/driving (braking and/or driving) force difference can be efficiently generated.

2. Description of Related Art

The turn assist utilizing the conventional braking force is disclosed in the patent document 1 listed below. According to the patent document 1, disclosed is a feed forward control in which a phase delay of the yaw moment of the vehicle is improved by the turn assist relying on the braking force.

[Patent Document 1] Japanese Patent No. 3788131

Figures 5A, 5B:
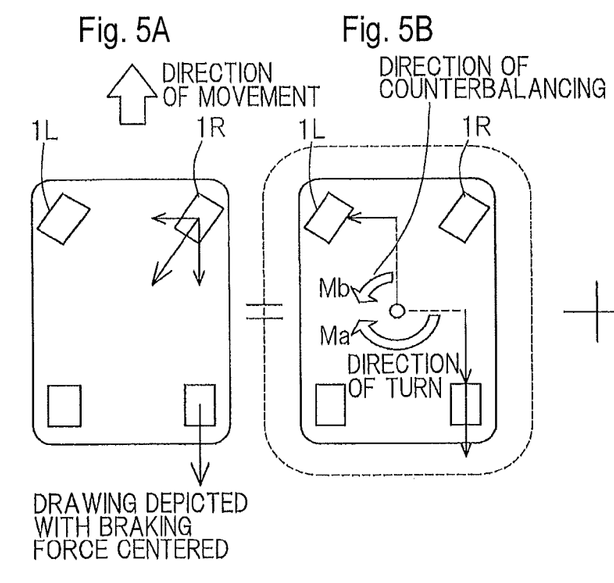
FIGS. 5A to 5C are diagrams showing respective conventional manners of turning assist.
Figure 5C:
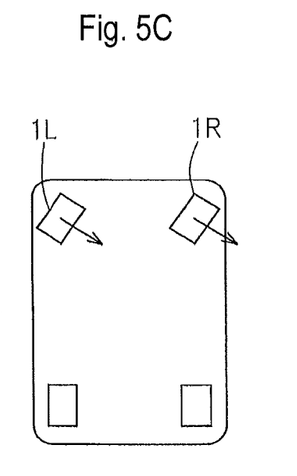

It has however been found that as shown in FIG. 5A, when a braking force difference is generated between the left and right vehicle wheels 1L and 1R so that the braking force on the vehicle wheel on the side inwardly with respect to the direction of turn or on the inside with respect to turning is rendered to be larger during the steering condition, the braking force is oriented towards the inside with respect to turning and, therefore, moment Ma in the direction of turn of the automotive vehicle and moment Mb counter to that direction of turn are simultaneously generated to counterbalance as shown in FIG. 5B. For this reason, the yaw moment cannot be efficiently generated and an effect of turn assist cannot therefore be obtained sufficiently. In view of this, without receiving any effect of turn assist, the vehicle wheel 1R must be forcibly turned as shown in FIG. 5C and, therefore, it is not efficient.

SUMMARY OF THE INVENTION

In view of the foregoing, an important object of the present invention is to provide a vehicle turning efficiency improving apparatus of a type in which the yaw moment of the automotive vehicle can be efficiently generated at the time an abrupt turn is required and, hence, an assured turn can be accomplished during the abrupt steering time.

In the description that follows, the summary of the present invention will be discussed with the aid of reference number employed in the accompanying drawings that illustrate an embodiment of the present invention.

A turning efficiency improving apparatus of the present invention of the automotive vehicle 20 is a turning efficiency improving apparatus including one of a braking system (for example, brakes 4L, 4R) and a driving train 6 configured to separately control braking forces or driving forces on left and right vehicle wheels 1L and 1R that are held at the same position in a forward-backward direction, and a steering mechanism 3 configured to separately steer the left and right vehicle wheels 1L and 1R, in which apparatus is provided with a turn assist control unit 9 to execute a turn assist control by producing a time difference in steering operation of the left and right vehicle wheels 1L and 1R and a braking/driving (braking and/or driving) force difference between the left and right vehicle wheels 1L and 1R, when the steering mechanism 3 is driven in accordance with a steering command of the steering input device 18 to thereby generate a yaw moment. The steering input device 18 is, for example, a steering wheel. The braking/driving force difference means the difference between braking forces or between driving forces, or the both difference.

According to the present invention, as the turn assist control, the braking/driving force difference of the left and right vehicle wheels 1L and 1R is caused to generate and, also, the time difference is caused to generate in the steering operation of the left and right vehicle wheels 1L and 1R. This time difference may be either by way of delaying the start of steering of one of the vehicle wheels 1L and 1R or by way of steering thereof at a reduced velocity. Because of the time difference in the steering operation, the direction of a force towards the automotive vehicle 20 that generates yaw moment is oriented in the backward direction of the automotive vehicle and, hence, the yaw moment of the automotive vehicle 20 can be efficiently generated. For this reason, an assured steering can be performed at the time of emergency steering. It is to be noted that this turn assist control may be employed not only when the steering angle is made large, but also when steering is made to allow the steering angle to return to a neutral angle.

In an embodiment of the present invention, where the automotive vehicle 20 is provided with brakes 4L and 4R configured to control respective braking forces of the left and right vehicle wheels 1L and 1R separately, the turn assist control unit 9 may be configured to cause a delay in turning of the vehicle wheel 1L and 1R on one inside with respect to turning, as the turn assist control for making the steering angle large, and to generate a braking force difference between the left and right vehicle wheels 1L and 1R so that the braking force of the vehicle wheel 1L or 1R on the inside with respect to turning may become large. Where the steering angle is increased, by delaying the turn of the vehicle wheel 1L or 1R on the inside with respect to turning and causing the braking force difference between the left and right vehicle wheels 1L and 1R to be generated so that the braking force of the vehicle wheel 1L and 1R on the inside with respect to turning may become large, the direction of the force on to the automotive vehicle 20 in which the yaw moment is generated is oriented in the backward direction of the automotive vehicle. In this way, the yaw moment in the automotive vehicle can be generated efficiently. For this reason, an assured steering at the time of emergency steering can be accomplished.

In another embodiment of the present invention, the turn assist control unit 9 may include a determining block 11 to determine the degree of exigency of steering in accordance with a predetermined rule R in response to a steering command from the steering input device 18 and the turn assist control may be executed only when the determining block 11 determines that the degree of exigency is high. Except for an emergency, for example, abrupt steering, during the normal steering, a proper steering in response to the driver's steering operation is possible without turn assist such as, for example, generating the braking/driving force difference and/or the time difference in steering operation between the left and right vehicle wheels 1L and 1R. Also, in order to avoid the unpleasant sensation in steering, it is also preferred that no turn assist is carried out. For this reason, the turn assist control referred to above is executed only when it is determined by the determining block 11 that the degree of exigency is high, that is, a driver's intent to evade the obstacle is determined from a steering command from the steering input device 18 to be great. Accordingly it is possible to cause the yaw moment by the turn assist control to be efficiently generated when in need while the unpleasant sensation in the steering is avoided.

In a further embodiment of the present invention, the determination of the degree of exigency by the determining block 11 may be carried out by means of the steering angular velocity and the steering angular acceleration of the steering input device 18. Generally when the driver's intent to evade the obstacle is firm, the absolute value of the steering angular velocity becomes large. Also, with the steering angular acceleration, it is possible to determine whether there is an intent to steer or to hold the steering. Accordingly, if the determination of the degree of exigency by the determining block 11 is carried out with respective values of the steering angular velocity and the steering angular acceleration of the steering input device 18, the proper determination of the degree of exigency appropriate to the driver's intent can be performed.

In a yet embodiment of the present invention, in addition to the determination of the degree of exigency made in response to the steering command of the steering input device 18, the determining block 11 may have a function of determining the degree of exigency in dependence on a detection content of an ambient environment acquiring sensor 21 to detect an ambient environment necessary for a collision determination of the automotive vehicle 20 provided in the automotive vehicle 20. The ambient environment acquiring sensor 21 may include, for example, a camera 15 for imaging a forward scene, a distance sensor 16 for detecting the distance to the obstacle and/or an ultrasonic sensor. With the detection content of the ambient environment sensor 21, it is possible to determine the degree of exigency required to evade the obstacle. In addition to the determination of the degree of exigency in response to the steering command of the steering input device 18, the detection content of the ambient environment acquiring sensor 21 is used to determine the degree of exigency, the determination of a further proper degree of exigency can be accomplished.

In a yet further embodiment of the present invention, when the turn assist control unit 9 includes the determining block 11 to determine the degree of exigency of steering in accordance with a predetermined rule R in response to a steering command from the steering input device 18, the turn assist control unit 9 may increase the assist amount or an upper limit value thereof which assist amount defines the extent to which the braking/driving force difference of the left and right vehicle wheels 1L and 1R is generated as the degree of exigency determined by the determining block 11 is high. The turn assist control relying on the time difference in steering operation between the left and right vehicle wheels 1L and 1R mentioned above and/or the braking/driving force difference of the left and right vehicle wheels 1L and 1R makes a contribution to the certainty of the steering operation at the time of emergency. But an excessive turn assist control may leads to the generation of the yaw moment more than necessary, the generation of a lateral velocity more than necessary, the unpleasant sensation in steering or the slippage of the vehicle wheels 1L and 1R. Accordingly, the assist amount, which defines the braking/driving force difference of the left and right vehicle wheels 1L and 1R or the upper limit value of such assist amount is adjusted in dependence on the degree of exigency and various information obtained from, for example, the ambient environment acquiring sensor 21, it is possible to secure a proper yaw moment and a proper lateral velocity to reduce the unpleasant sensation to the steering and to avoid the slippage of the vehicle wheels.

In a yet further embodiment of the present invention, the determining block 11 may determine a predetermined turn assist terminating condition and terminate the turn assist control by the turn assist control unit 9 in the event that it is determined that the turn assist terminating condition is satisfied. During the turn assist, the braking/driving force is controlled in dependence on the assist amount, but it may occur that the turn assist is no longer necessary as a result of the occurrence of a change in condition during that time. If such change in condition is compared with the turn assist terminating condition by the determining block 11 and if the terminating condition is satisfied, a transit is made to the normal steering. By so doing, it is possible to secure the proper yaw moment and the proper lateral acceleration while the excessive turn assist control is avoided, to reduce the unpleasant sensation to the steering, and to avoid the slippage of the vehicle wheels.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, taken in conjunction with the accompanying drawings. However, the embodiments and the drawings are given only for the purpose of illustration and explanation, and are not to be taken as limiting the scope of the present invention in any way whatsoever, which the scope is to be determined by the appended claims. In the accompanying drawings, like reference number are used to denote like parts or appropriate parts throughout the several views, and:

DESCRIPTION OF EMBODIMENTS

Figure 1:
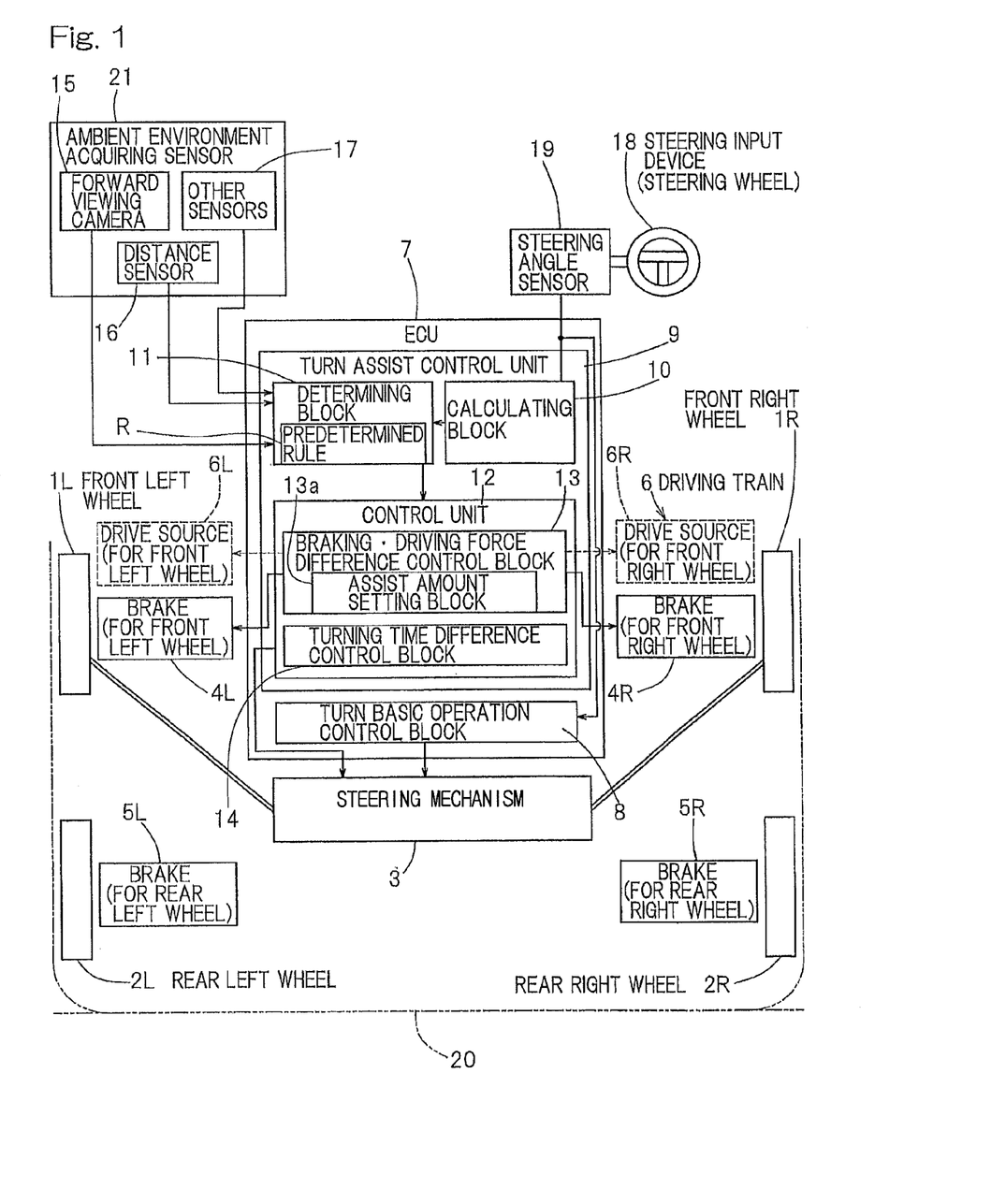
FIG. 1 is a block diagram showing a conceptual construction of a vehicle turning efficiency improving apparatus designed in accordance with a preferred embodiment of the present invention.

A preferred embodiment of the present invention will be described with reference to FIG. 1 to FIGS. 4A to 4C. Referring first to FIG. 1, an automotive vehicle 20 to which the preferred embodiment of the present invention is applied is a four wheeled vehicle such as, for example, a passenger car of a type having front left and right vehicle wheels 1L and 1R as steerable vehicle wheels and includes a steering mechanism 3 capable of turning the front left and right vehicle wheels 1L and 1R separately. The travel drive may be either a type in which either the left and right vehicle wheels 1L and 1R forming the front left and right vehicle wheels or the left and right vehicle wheels 2L and 2R forming rear left and right vehicle wheels are driven or a four wheel drive type in which the four front and rear vehicle wheels are driven, and a drive source thereof may be either an internal combustion engine, an electrically operated motor or a hybrid drive type comprising both. It is, however, to be noted that left and right brakes 4L and 4R each capable of accomplishing a separate braking force control on one of the associated vehicle wheels 1L and 1R, which forms the steerable vehicle wheels, are provided for the vehicle wheels 1L and 1R, respectively. Left and right brakes 5L and 5R for the rear left and right vehicle wheels 2L and 2R, which forms corresponding non-steerable vehicle wheels, may be of a type incapable of controlling the left and right vehicle wheels separately or a type capable of controlling the left and right vehicle wheels separately. Each of the brakes 4L, 4R, 5L and 5R forming a braking system may be a hydraulic brake or any other type brake such as, for example, an electrically operated type or a wire actuated type.

It is also to be noted that the left and right vehicle wheels 1L, 1R, which form the steerable vehicle wheels, may not necessarily be a type of separately braking force control, but in that case a driving train 6 capable of controlling respective driving forces of the left and right vehicle wheels 1L and 1R separately is provided therefor. This driving train 6 includes respective left and right drive sources 6L and 6R, each of which is, for example, an in-vehicle wheel motor or the like. It is again to be noted that FIG. 1 illustrates an example, in which the respective braking forces of the left and right vehicle wheels 1L and 1R can be controlled separately, and in which the drive sources 6L and 6R for separately driving the left and right vehicle wheels are not employed. However, for the sake of brevity an example, in which the drive sources 6L and 6R are employed, is shown by the use of broken line blocks added to FIG. 1.

The control system will now be described in detail. An ECU 7 is an electric control unit which controls all the automotive vehicle 20 and is comprised of a computer, an application program executed by such computer and electronic circuits. This electric control unit 7 is provided with a turn basic operation control block 8 and a turn assist control unit 9 as a control means associated with the steering.

The turn basic operation control block 8 is a means for controlling the steering mechanism 3 in accordance with a steering command fed from a steering input device 18 and is operable in response to the above steering command to turn the left and right vehicle wheels 1L and 1R in the same angle. The steering input device 18 is in the form of, for example, a steering wheel and the steering command therefrom is an output of a steering angle sensor 19 used to detect the steering angle which is the angle of rotation of the steering input device 18.

The turn assist control unit 9 referred to above is a means operable to perform a turn assist control which is a control to produce a time difference in a turning operation of the left and right vehicle wheels 1L and 1R forming the front vehicle wheels when the steering mechanism 3 is driven in accordance with the steering command from the steering input device 18 and also to generate a braking/driving force difference between the left and right vehicle wheels 1L and 1R, thereby to generate a yaw moment. The "braking/driving force difference" generated as a result of this turn assist control is a braking force difference in the case without driving train 6 for individually driving the left and right vehicle wheels 1L and 1R. Where the driving train 6 (drive sources 6L and 6R) capable of controlling the left and right vehicle wheels individually is employed, it may be a driving force difference, and, also, where both of the driving train 6 capable of controlling the left and right vehicle wheels individually and the brakes 4L and 4R capable of controlling the left and right vehicle wheels individually are employed, it may be one of the braking force difference and the driving force difference or both of them. The turn assist control unit 9 includes a calculating block 10, a determining block 11, and a control unit 12 and the control unit 12 comprises a braking/driving force difference control block 13 and a turning time difference control block 14.

The calculating block 10 is a means for calculating the steering angular velocity and the steering angular acceleration from the steering angle output from the steering angle sensor 19. This calculating block 10 may not be necessarily provided as a part of the turn assist control unit 9 and may be provided as a function of, for example, the steering angle sensor 19. In other words, the steering angle sensor 19 may be of a type capable of outputting the steering angular velocity and the steering angular acceleration. Also, the determining block 11 referred to above may have a function of the calculating block 10.

The determining block 11 is a means to determine the degree of exigency of the steering in accordance with a predetermined rule R in response to the steering command from the steering input device 18, and the control unit 12 performs the turn assist control only when the determining block 11 determines that the degree of exigency is high. The predetermined rule R referred to above is a rule that defines, for example, the relation between respective values of the steering angular velocity and the steering angular acceleration of the steering input device 18 calculated by the calculating block 10, and the degree of exigency of the steering. More specifically, the predetermined rule R referred to above is, for example, a steering pattern dependent on the situation of a vehicle driver and determines in the light of this steering pattern. The steering pattern dependent on the situation of the vehicle driver includes, for example, patterns obtained from the relation among the vehicle velocity, the steering angle, the steering angular velocity and the steering angular acceleration. The steering pattern is to be arbitrarily set up dependent on, for example, a series of experiments and/or simulations and may be updated by learning with repetition of an actual driving while an initial value has been set in.

The determining block 11 referred to above may include, in addition to the capability of determining the degree of exigency in response to the steering command from the steering input device 18, a function of determining the degree of exigency according to contents of detection an ambient environment acquiring sensor 21. The ambient environment acquiring sensor 21 is a generic term of various sensors in order to detect the ambient environment provided in the automotive vehicle 20 for determining a collision of the automotive vehicle 20 and includes, for example, a forward viewing camera 15, a distance sensor 16 and other sensors 17. The other sensors 17 include, for example, a vehicle velocity sensor. The forward viewing camera 15 is a camera for imaging a scene forwardly of the automotive vehicle 20 and includes, for example, a CCD camera or the like capable of outputting a digital signal of the scene photographed. The output of the forward viewing camera 15 is processed by an image processing unit (not shown) which may be a part of the determining block 11 or a part different therefrom and the processed result is used in the determining block 11 to determine the degree of exigency. The distance sensor 16 is a sensor for detecting the distance between the automotive vehicle 20 and an obstacle and is employed in the form of, for example, an ultrasonic sensor or the like.

As described above, the determining block 11 provides the control unit 12 with the command to do the turn assist control only when the degree of exigency is determined high, in addition to determine the degree of exigency. The determining block 11 may have, in addition to such function, a function of providing the braking/driving force difference control block 13 in the control unit 12 with one, arbitrarily chosen two or all of a command for increasing the assist amount that determines the braking/driving force difference of the left and right vehicle wheels 1L and 1R as the degree of exigency is high, a command for increasing an assist gain representative of the proportion between the assist amount and the degree of exigency, and a command for increasing the upper limit value of the assist amount.

Figure 3:
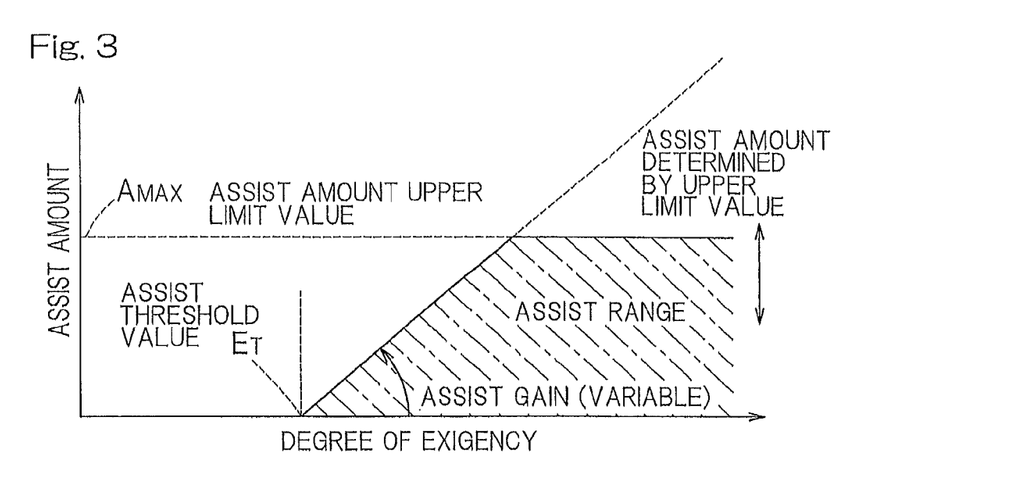
FIG. 3 is a chart showing a relation among an assist amount, the upper limit of the assist amount, an assist gain and the degree of exigency.

The assist amount, the upper limit value of the assist amount, the assist gain and the degree of exigency have such a relationship as shown in, for example, FIG. 3:

(Assist Amount)=[(Degree of Exigency)−(Assist Threshold Value)]×(Assist Gain)

It is to be noted 0≤(Assist Amount)≤(Assist Amount Upper Limit Value)

As shown in FIG. 3, the assist amount increases along a curve depicting the assist gain as the degree of exigency increases, but it will not become greater than the assist amount upper limit value even when the degree of exigency becomes high, and assumes a constant value at the assist amount upper limit value. It is to be noted that the assist threshold value $E_T$ represents the minimum degree of exigency in order to take the assist. The assist gain is variable and changes according to some parameters such as, for example, the vehicle velocity. The assist amount upper limit value $A_{MAX}$ is also variable as is the case with the assist threshold value $E_T$ and changes according to some parameters such as, for example, the vehicle velocity. The manner of how each of the assist threshold value $E_T$ and the assist amount upper limit value $A_{MAX}$ change according to each of the parameters is appropriately defined in the turn assist control unit 9. Referring to FIG. 3, a range enclosed by the axis of abscissas representing the degree of exigency, a line representing the assist gain and the horizontal line representing the assist amount upper limit value is an assist range in which the assist is performed.

It is to be noted that the determining block 11 may be so designed as to perform only to determine the degree of exigency, and in such case a process to increase the assist amount, a process to increase the assist gain and a process to increase the upper limit value of the assist amount may be performed by the control unit 12 according to the degree of exigency given by the determining block 11.

Also, the determining block 11 determines a predetermined turn assist terminating condition and then outputs a command to terminate the turn assist control by the control unit 12 in the turn assist control unit 9 when the determining block 11 determines that the turn assist terminating condition is satisfied. With respect to the termination of the turn assist control, it may be so designed that the determining block 11 may determine only the turn assist terminating condition and, in dependence on a result of determination thereof, the control unit 12 may cause the turn assist control to be terminated.

The braking/driving force difference control block 13 in the control unit 12 is a means for performing a control of the braking forces of the left and right brakes 4L and 4R or a control of the driving forces of the left and right drive sources 6L and 6R so that the braking/driving force difference may be produced in dependence on the assist amount set in an assist amount setting block 13a. The assist amount setting block 13a is capable of freely updating the assist amount.

The turning time difference control block 14 in the control unit 12 is a means for producing a time difference in turning operation between the left and right vehicle wheels 1L and 1R. This time difference may be caused by a delay in starting the turn of any one of the vehicle wheels 1L and 1R, by simultaneous initiation of turning followed by turning any one of the vehicle wheels 1L and 1R at a lower speed, or by both of the delay in starting the turning and the speed difference in turning.

Figures 4A, 4B:
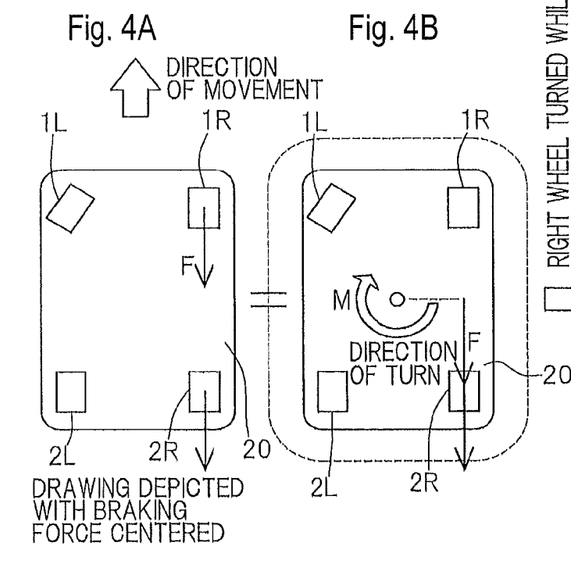
FIGS. 4A to 4C are diagrams showing respective manners of turning assist performed by the turning efficiency improving apparatus.

Hereinafter, the function and the sequence of operation of the above described construction will be explained. A specific function of each of the various blocks in the turn assist control unit 9 is also explained together with the following functions. Summarizing the functions, as shown in FIGS. 5A to 5C and as hereinbefore described, if the braking/driving force difference is merely generated during a turning condition, the braking/driving force is oriented inside of the automotive vehicle and, therefore, as shown in FIG. 5B, the moment in a direction of turn of the automotive vehicle 20 and the moment in a direction counter thereto are generated simultaneously and counterbalanced with each other. Accordingly, in the embodiment now under discussion, using the steering mechanism 3 that is separate between the left and right vehicle wheels, the vehicle wheel 1L on an outer side with respect to the direction of turn as shown in FIG. 4A is turned in the direction of turn, but the vehicle wheel 1R on an inner side with respect to the direction of turn and applied a braking force is not turned immediately or turned at lower than that of the vehicle wheel 1L. By so doing, as shown in FIG. 4B, yaw moment is generated. Since the direction of a force F of the automotive vehicle 20 caused by the braking allows the automotive vehicle to be oriented in backward direction, the yaw moment M of the automotive vehicle can be efficiently generated and, as shown in FIG. 4C, the vehicle wheel 1R can be also turned with braking controlled to weaken.

Figure 2:
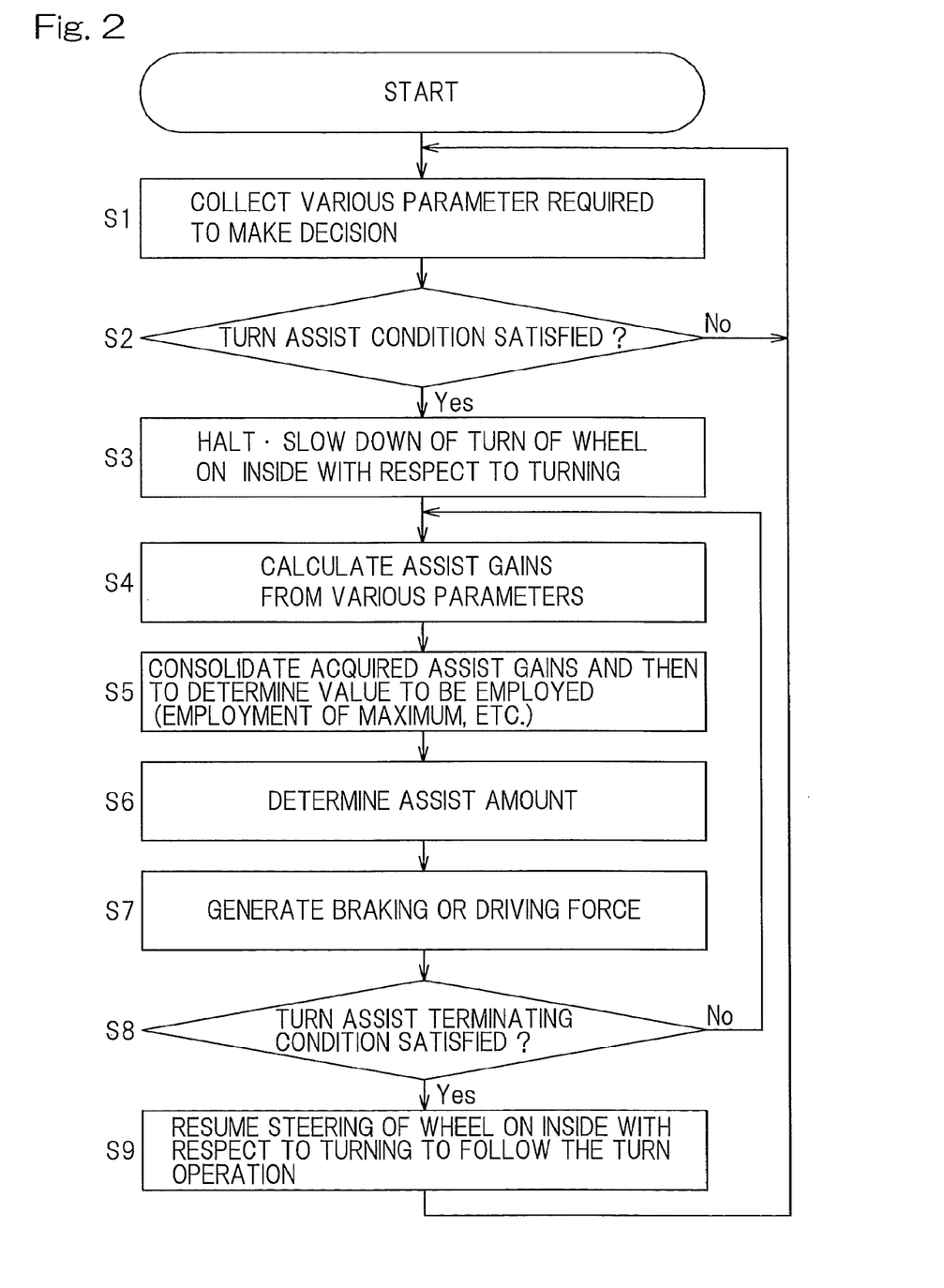
FIG. 2 is a flow chart showing the sequence of control performed by the turning efficiency improving apparatus.

The sequence of operation will now be described in detail. FIG. 2 illustrates a flow chart showing one example of the control executed by the turn assist control unit 9, and reference will now be made to FIG. 2 together with FIG. 1 to describe the sequence of operation. At step S1 subsequent to the start, various parameters for making a decision of whether or not the turn assist is to be operated are collected. In other words, an output of the steering angle sensor 19 and an output of the ambient environment acquiring sensor 21 are monitored by the determining block 11 to determine the degree of exigency (a driver's intent to evade). At the subsequent step S2, a decision is made to determine whether the degree of exigency so determined satisfies the predetermined turn assist condition. Based on this decision, the program flow returns to the parameter collecting step S1 if the condition is not satisfied. Even the various parameters referred to above includes, for example, the steering angle, the steering angular velocity and the steering angular acceleration obtained from the output of the steering angle sensor 19 and various information obtained from the ambient environment acquiring sensor 21.

Figure 4C:
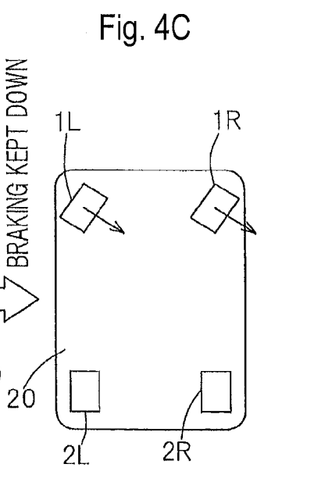

If the condition is satisfied, the turn of the vehicle wheel 1R (as shown in FIGS. 4A to 4C) on an inner side with respect to the direction of turn is halted as detailed later or slowed down at step S3 and the determining block 11 or the braking/driving force difference control block 13 determines the gain (assist gain) of the braking/driving force, which is necessary to generate the yaw moment or the upper limit value thereabove (at steps S4 and S5), followed by step S6 at which the assist amount for determining the braking/driving force difference is determined using such value. By way of example, from the various parameters so collected as described above, the assist gains every each of predetermined items is calculated at step S4 and the individual calculated assist gain and the assist amount are consolidated to determine the value of the assist gain to be employed. For example, the value of the assist gain to be employed is rendered to be the maximum assist gain at step S5. The assist gain for each of the items is, for example, an assist gain for each of the parameters referred to above. The assist amount is determined from the degree of exigency and the assist gain employed above. If this value is greater than the assist amount upper limit value, the value is limited at step S6.

During those process steps S1 to S6, when the determining block 11 renders a decision using the steering information obtained from the calculating block 10, a decision is made by comparing with a steering pattern appropriate to, for example, the driver's situation in accordance with the predetermined rule R. If the degree of exigency is high and the driver's intent to evade is firm, the absolute value of the steering angular velocity becomes high. Specifically, the determining block 11 defines the threshold value as a for the absolute value of this steering angular velocity. Also, from the steering angular acceleration, it is possible to determine whether the intent to steer exists or whether transfer to steering hold is desired. When from the above the specific determination is carried out, if the steering angle is positive (Steering angle: positive in the case of a counterclockwise rotation), and when (the steering angular velocity)>α and (the steering angular acceleration)>0, it is determined as the situation of needing more steering angle in which the degree of exigency is high, but when (the steering angular velocity)<−α and (the steering angular acceleration)<0, it is determined as the situation of decreasing steering angle in which the degree of exigency is also high, thus, establishing a condition in which the turning assist control is executed. It is to be noted that if the steering angle is negative, the parameter a takes a negative value and, hence, signs of largeness or smallness mentioned above are reversed. Also, as each absolute value becomes larger, the assist amount to be set in the assist amount setting block 13a in the braking/driving force difference control block 13 has to be increased.

Also, the determining block 11, when the degree of exigency to evade is determined with the use of the ambient environment acquiring sensor 21 such as the forward viewing camera 15, the distance sensor 16 or an ultrasonic sensor, determines the degree of exigency by acquiring the distance to the obstacle and the amount of evasion required in a direction laterally of the automotive vehicle. Where the distance to the obstacle is small and the amount of evasion required is large, the degree of exigency is high. When the degree of exigency is higher than a certain value, it is rendered to be a condition for the turning assist control. The higher the degree of exigency, the greater the assist gain.

With respect to the setting of the assist gain, reference is also made to a condition other than the degree of exigency. Since the driver with his vehicle driven at a low speed is sensitive to a change in braking/driving force, it is necessary for the assist gain to be reduced. Also, in the case that the coefficient of friction on the road is determined small from the ABS (Anti-lock Braking System) operation and pieces of information from the various sensors 17, the generation of a high braking power may be considered to constitute a cause of slippage, the assist gain is reduced. In a similar manner, even in the event of generation of a yaw moment or a lateral acceleration higher than required, the assist gain is reduced in order to reduce the unpleasant sensation and also to avoid the slippage. It is to be noted that the calculation of the assist gain mentioned above takes place at all times during turning and the execution of the turning assist control and the assist amount is calculated with the use of the calculated assist gain so determined so that the setting value of the assist amount in the assist amount setting block 13a can be updated at all times.

The braking/driving force difference control block 13 in the control unit 12 performs a control of the braking/driving force of the brakes 4L and 4R or the drive sources 6L and 6R in accordance with the assist amount so calculated in the manner described above and subsequently set in the assist amount setting block 13a at step S7. When the brakes 4L and 4R are employed, the difference in braking force between the left and the right is generated according to the assist amount (even when one side is zero) and the braking force on the vehicle wheel on the inside with respect to turning (the right side vehicle wheel 1R in FIGS. 4A to 4C) is increased to a value greater than the braking force on the vehicle wheel (1L) on the outside.

Where the automotive vehicle includes the driving train 6 (the driving sources 6L and 6R) having a capability of separate control of the left and right driving forces such as represented in an automotive vehicle utilizing in-wheel motors, in addition to the use of the brakes 4L and 4R, the negative driving force is generated on the vehicle wheel 1R on the inside with respect to turning. As discussed above, external forces are produced from the road surface on the left and right vehicle wheels 1L and 1R and an external force due to a difference between braking force/driving force can lead to generation of the yaw moment in the automotive vehicle 20 and, hence, this is referred to as the turn assist.

Simultaneously with the foregoing operation, in order to efficiently generate the yaw moment by the braking/driving force difference, the turn of the vehicle wheel 1R on the inside with respect to turning is halted or slowed down with the use of a left and right separate steering mechanism 3 to thereby decrease the angle between the external force from the road surface as a result of the generation of the braking or driving force and the traveling direction of the automotive vehicle 20 at step S3. By so doing, a counterbalance force of the yaw moment produced when the braking/driving force difference is generated during the steering condition, can be suppressed.

While the efficient generation of the yaw moment can be realized if the turn of the vehicle wheel 1R on the inside with respect to turning is halted or slowed down, the vehicle wheel 1R on the inside with respect to turning will form a resistance enough to hamper the turn when the turn is continued as it is. Accordingly, the turning time difference control block 14 serves to allow the steering angle of the vehicle wheel 1R on the inside with respect to turning to follow the steering operation, at step S9, after turning starts, by generating the yaw moment in the manner described above.

Although even during the turn assist, the braking/driving force is controlled according to the ever changing assist amount, the determining block 11 determines the turning assist condition even during the turn assist at all times at step S8 and in the event that the turn assist terminating condition is satisfied, for example, in the event that it departs from the turn assist condition, the turn assist control is terminated to allow a normal steering to be resumed, followed by the return to step S1. The normal steering is a steering performed by the turn basic operation control block 8. The turn assist terminating condition that terminates this turn assist control may be a condition different from a condition for initiating the turn assist or the same as that condition.

The time at which the steering angle satisfies the previously discussed condition of the turn assist may vary depending on the running condition/driver and shows the actual measurement of about 200 ms and almost coincides with the time of about 200 ms which elapses from the steering angle input to the automotive vehicle 20 to the generation of the yaw moment. For this reason, if the steering information is taken as a condition, the condition for the turn assist termination uses the steering information as a reference.

As a condition, other than that, for the turn assist termination determined by the determining block 11, detection of a yaw moment and/or lateral acceleration using information acquired by an acceleration and/or angular velocity sensor, which is mounted as one of the other sensors 17 can be enumerated. The yaw moment and/or lateral velocity generated in the automotive vehicle 20 is used as a parameter for the assist gain calculation and the condition for the turn assist termination. In either case, since effects are affected by the kinetic characteristics of the automotive vehicle 20, it is recommended to perform an adjustment such as, for example, setting a predetermined delay time. Also, in order to avoid a hunting (in which a parameter for making a decision lies on the boundary between ON/OFF conditions and, therefore, the ON/OFF are repeated), a certain filter and/or delay time is preferably set.

According to the turning efficiency improving apparatus for the automotive vehicle 20, which device is designed in accordance with the foregoing embodiments of the present invention, the yaw moment can be efficiently generated in the automotive vehicle 20, when an abrupt turn is required, and, hence, an assured steering can be accomplished at the time of an emergency steering.

It is to be noted that in describing the foregoing embodiment, reference has been made to a front wheel steering type, but the present invention can be equally applied to a rear wheel steering type.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMBER 1L, 1R . . . Vehicle wheel
3 . . . Steering mechanism
4L, 4R . . . Brake
6 . . . Driving train
6L, 6R . . . Drive source
8 . . . Turn basic operation control block
9 . . . Turn assist control unit
10 . . . Calculating block
11 . . . Determining block
12 . . . Control unit
13 . . . Braking/driving force difference control block
14 . . . Turning time difference control block
15 . . . Camera
16 . . . Distance sensor
17 . . . Other sensors
18 . . . Steering input device
19 . . . Steering angle sensor
20 . . . Automotive vehicle
21 . . . Ambient environment acquiring sensor
M . . . Yaw moment
R . . . Predetermined rule

What is claimed is:

1. A turning efficiency improving apparatus for an automotive vehicle which comprises one of a braking system and a driving train configured to separately control braking forces or driving forces on left and right vehicle wheels that are held at a same position in a forward-backward direction, and a steering mechanism configured to separately steer the left and right vehicle wheels, wherein the improvement comprises:
    a turn assist control unit to execute a turn assist control by producing a time difference in steering operation of the left and right vehicle wheels and at least one of a braking and a driving force difference between the left and right vehicle wheels, when the steering mechanism is driven in accordance with a steering command of the steering input device to thereby generate a yaw moment.

2. The turning efficiency improving apparatus for the automotive vehicle as claimed in claim 1, in which the automotive vehicle is provided with brakes configured to control respective braking forces of the left and right vehicle wheels separately and the turn assist control unit is configured to cause a delay in turning of the vehicle wheel on one inside with respect to turning, as the turn assist control for making the steering angle large, and to generate a braking force difference between the left and right vehicle wheels so that the braking force of the vehicle wheel on the inside with respect to turning may become large.

3. The turning efficiency improving apparatus for the automotive vehicle as claimed in claim 1, in which the turn assist control unit comprises a determining block to determine the degree of exigency of steering in accordance with a predetermined rule in response to a steering command from the steering input device and the turn assist control is executed only when the determining block determines that the degree of exigency is high.

4. The turning efficiency improving apparatus for the automotive vehicle as claimed in claim 3, in which the determination of the degree of exigency by the determining block is carried out by means of the steering angular velocity and the steering angular acceleration of the steering input device.

5. The turning efficiency improving apparatus for the automotive vehicle as claimed in claim 3, in which in addition to the determination of the degree of exigency made in response to the steering command of the steering input device, the determining block has a function of determining the degree of exigency in dependence on a detection content of an ambient environment acquiring sensor to detect an ambient environment necessary for a collision determination of the automotive vehicle provided in the automotive vehicle.

6. The turning efficiency improving apparatus for the automotive vehicle as claimed in claim 3, in which the turn assist control unit increases the assist amount which defines the extent to which the at least one of the braking and the driving force difference of the left and right vehicle wheels is generated as the degree of exigency determined by the determining block is high.

7. The turning efficiency improving apparatus for the automotive vehicle as claimed in claim 3, in which the turn assist control unit increases an upper limit value of the assist amount which defines the extent to which the at least one of the braking and the driving force difference of the left and right vehicle wheels is generated as the degree of exigency determined by the determining block is high.

8. The turning efficiency improving apparatus for the automotive vehicle as claimed in claim 3, in which the determining block determines a predetermined turn assist terminating condition and terminates the turn assist control by the turn assist control unit in the event that it is determined that the turn assist terminating condition is satisfied.

* * * * *